United States Patent
Kent et al.

(10) Patent No.: US 9,069,541 B2
(45) Date of Patent: Jun. 30, 2015

(54) DIGITAL RACK INTERFACE POD (DRIP) WITH INTELLIGENT POWER CONTROL SYSTEM AND METHOD

(75) Inventors: Phillip R. Kent, Monroe, WA (US); Karl Mills, Lynnwood, WA (US)

(73) Assignee: AVOCENT HUNTSVILLE CORP., Huntsville, AL (US)

( * ) Notice: Subject to any disclaimer, the term of this patent is extended or adjusted under 35 U.S.C. 154(b) by 287 days.

(21) Appl. No.: 13/877,487

(22) PCT Filed: Sep. 29, 2011

(86) PCT No.: PCT/US2011/054015
§ 371 (c)(1), (2), (4) Date: May 7, 2013

(87) PCT Pub. No.: WO2012/047716
PCT Pub. Date: Apr. 12, 2012

(65) Prior Publication Data
US 2013/0232352 A1     Sep. 5, 2013

Related U.S. Application Data

(60) Provisional application No. 61/389,616, filed on Oct. 4, 2010, provisional application No. 61/488,665, filed on May 20, 2011.

(51) Int. Cl.
G06F 1/26    (2006.01)
G06F 1/30    (2006.01)

(52) U.S. Cl.
CPC ............... G06F 1/266 (2013.01); G06F 1/30 (2013.01); G06F 1/263 (2013.01)

(58) Field of Classification Search
CPC ............ G06F 1/263; G06F 1/266; G06F 1/30
See application file for complete search history.

(56) References Cited

U.S. PATENT DOCUMENTS

2007/0025452 A1    2/2007   Schindler
2008/0136385 A1*   6/2008   Hsieh et al. .................. 323/273
(Continued)

FOREIGN PATENT DOCUMENTS

WO    WO-2008/021052 A2    2/2008

OTHER PUBLICATIONS

International Search Report and Written Opinion for PCT/US2011/054015, mailed Mar. 19, 2012; ISA/EP.

*Primary Examiner* — Albert Wang
(74) *Attorney, Agent, or Firm* — Harness, Dickey & Pierce, P.L.C.

(57) ABSTRACT

An intelligent power control system and method adapted for use with a digital rack interface pod (DRIP). A switching regulator generates a set output voltage. If power is available from a USB port of an external device, such as an external server, then the system uses this power to power the DRIP. If DC power is detected as being received on a different input from an external power transformer, then the system may still continue to use the power being received from the USB port to power the DRIP. If power from the USB port of the external device is lost but power from the external transformer is present, then the system may use the power available from the external transformer to power the DRIP. If the DRIP is being powered by USB power from the external device, and no DC power is available from the external transformer, but backup power from an appliance to which the DRIP is coupled is being received on one of the DRIP's power input ports, then the DRIP may switch to backup power from the appliance if power from the USB port of the external device (e.g., server) is lost. The system thus intelligently prioritizes the use of power available from a plurality of different power sources to maintain the DRIP powered on when one or more of the power sources is lost or otherwise not available.

22 Claims, 7 Drawing Sheets

(56) References Cited

U.S. PATENT DOCUMENTS

2008/0203818 A1 8/2008 Kuo
2009/0082910 A1 3/2009 Sato
2011/0113166 A1* 5/2011 Hung et al. .................... 710/63

* cited by examiner

DIGITAL RACK INTERFACE POD (DRIP) WITH INTELLIGENT POWER CONTROL SYSTEM AND METHOD

CROSS-REFERENCE TO RELATED APPLICATIONS

This application claims the benefit of U.S. Provisional Application No. 61/389,616 filed on Oct. 4, 2010 and U.S. Provisional Application No. 61/488,665 filed on May 20, 2011. The disclosures of the above applications are incorporated herein by reference.

FIELD

The present disclosure relates to rack interface pods that are used to interface a server to a remote access appliance, and more particularly to a digital rack interface pod (DRIP) that includes an intelligent power control subsystem that intelligently prioritizes the use of power from a plurality of different power sources when one or more of the power sources becomes unavailable for use.

BACKGROUND

The statements in this section merely provide background information related to the present disclosure and may not constitute prior art.

Remote access appliances are used frequently in modern day data centers to interface with and establish communications links with a plurality of servers or other serial or Ethernet type devices. Traditionally this has required separate remote access appliances, one for Ethernet and one for serial. In one implementation, the assignee of the present application, Avocent Corp., may also use the Ethernet interface on the remote access appliance to receive digitized data from a digital rack interface pod (DRIP), where the DRIP is interfaced between the server and the remote access appliance. The DRIP receives analog video signals and serial data from the server and converts this information to a digital format, and then forwards the digital information in Ethernet protocol format to the appliance.

A first method by which the DRIP may be powered is through a step down transformer that is plugged into an AC outlet in the data center. To enable this, the DRIP incorporates a power input port to receive the rectified DC voltage from the step down transformer. Obviously, the drawback with this requirement is the need for an external step down transformer and the need for an available AC power outlet to plug the step down transformer into. As one will appreciate, this configuration can also lead to a significant increase in the amount of wiring present in a data center room. Typically a separate DRIP is used to interface a single output port of a remote access appliance to a single server. So if 40 servers are being used in the data center, then 40 DRIPs will be required. If 500 servers are being used, then 500 DRIPs will be required, and so forth. As one can see, the requirement of an available power outlet and the use of a separate power transformer for each DRIP can potentially lead to significant additional costs in implementing a DRIP.

A second means by which a DRIP may be powered is from its server's universal serial bus (USB) port. This approach is typically preferred by many data center managers as it eliminates the use of step down transformers and the need for available AC power outlets to plug the step down transformers into, and thus also makes for a "cleaner" installation with less wiring in the vicinity of the servers. However, if the server shuts down for any reason, then the DRIP will lose its power. This will end any Ethernet session that the DRIP was handling. If the server is then powered back up a short time later, many server models will delay applying power to the designated power pins of its USB port for at least several seconds while it begins to re-boot. So if the DRIP has been relying on power from the server's USB port, this means that the DRIP will have lost power when the server shuts down, and further that power will typically not be applied to the DRIP when the server begins to re-boot. At some point during the boot-up process the server will again begin applying power to the appropriate pins of its USB port, which will then power up the DRIP again, allowing a remote user to establish a new session with the DRIP and the server.

In the event the server has gone down because of a problem, and a data center person needs to troubleshoot the server, the reliance on power from the server's USB port is particularly disadvantageous to the DRIP. This is because when the server begins to re-boot, the BIOS screen, which typically is generated during the first few seconds of the boot-up process, will not be captured by the DRIP because the DRIP will not yet be powered back on. As those skilled in the art will appreciate, the ability to capture the BIOS screen on a server when it re-boots is a significant advantage when it comes to remotely attempting to troubleshoot a problem with a server. Without being able to capture the BIOS screen information, the ability to perform remote access troubleshooting on the server is significantly compromised.

Still further, if the DRIP is not able to draw on power from a step down transformer, but some other power source was able to supply power to the DRIP besides the USB port of the server, then a challenge arises as to how to control which power source the DRIP is to use, and under what condition(s). If the DRIP could intelligently switch to a backup power source (i.e., other than power from a step down transformer) when its primary power source (i.e., power from the USB port of the server) is lost, this would allow the DRIP to remain powered on when the server it is communicating with shuts down. This would also allow the Ethernet session that was in progress with the DRIP to be maintained. This would be extremely valuable because it would allow the DRIP to remain powered on while the server is powered back on and begins to re-boot. In this circumstance the DRIP would be able to capture the BIOS screen information output from the server's USB port.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1A:
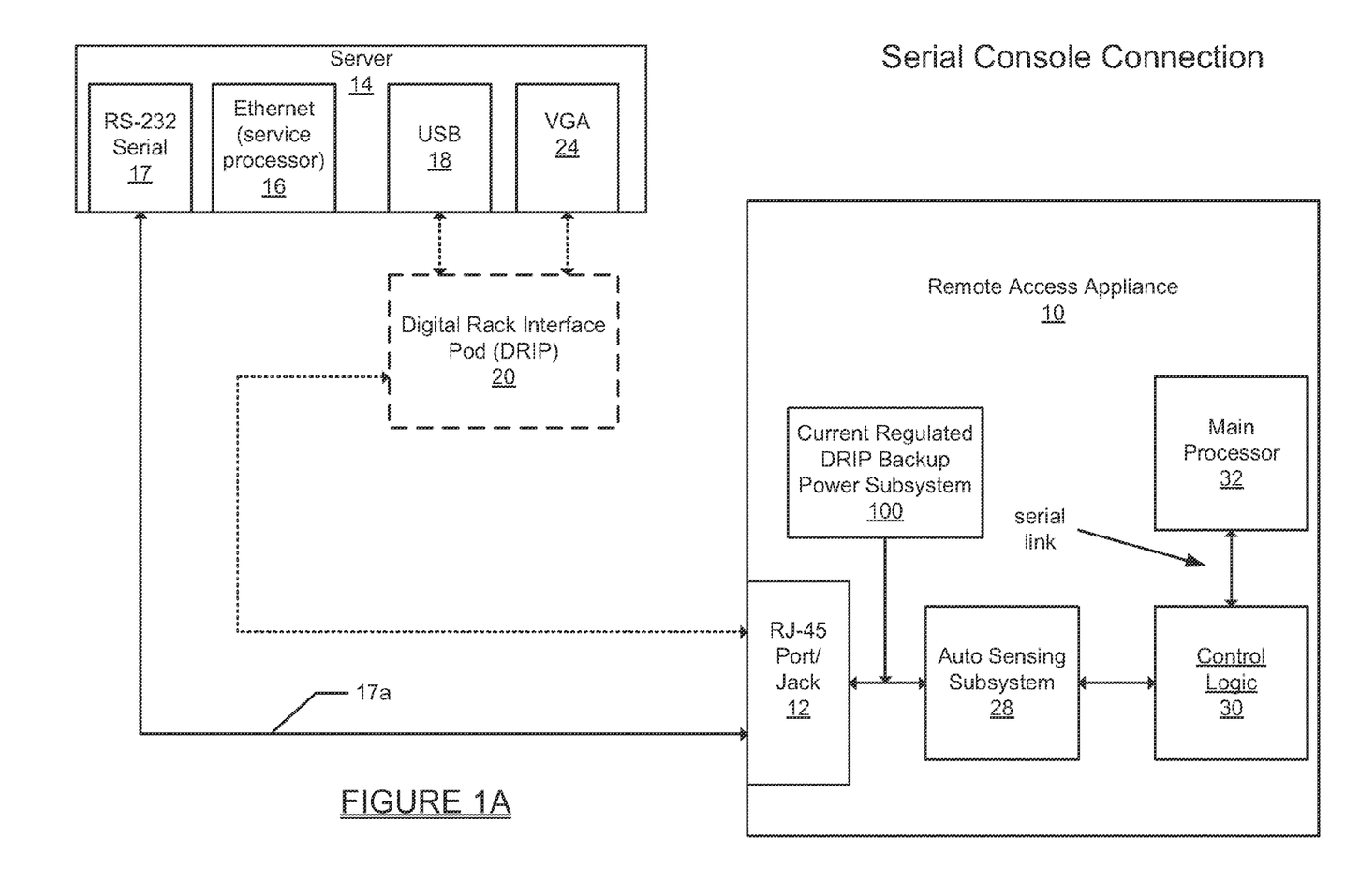
FIGS. 1A-1C are high level block diagrams illustrating several different types of connections that may be made between a communications port of a remote access appliance and a remote server.
Figure 1B:
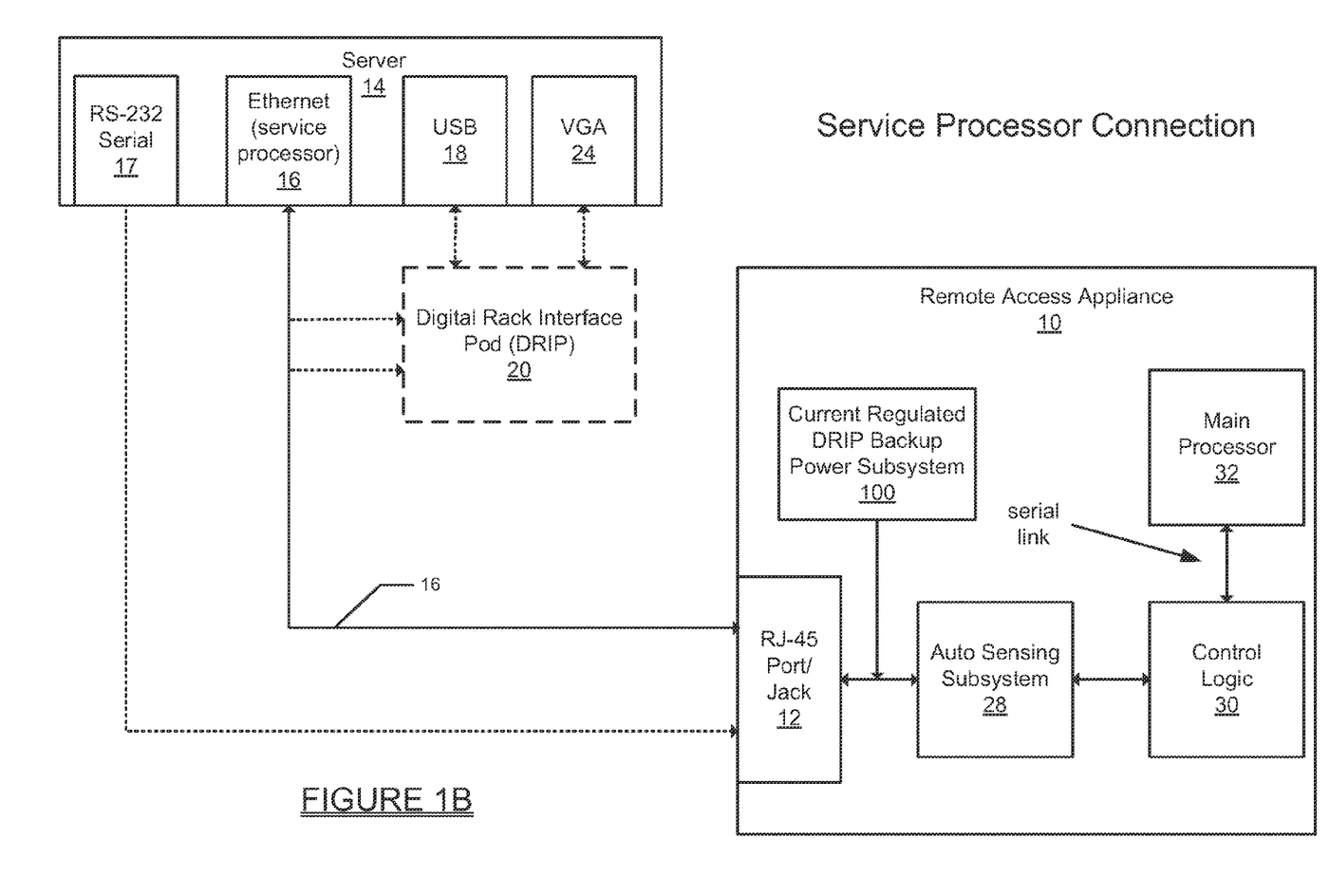
Figure 1C:
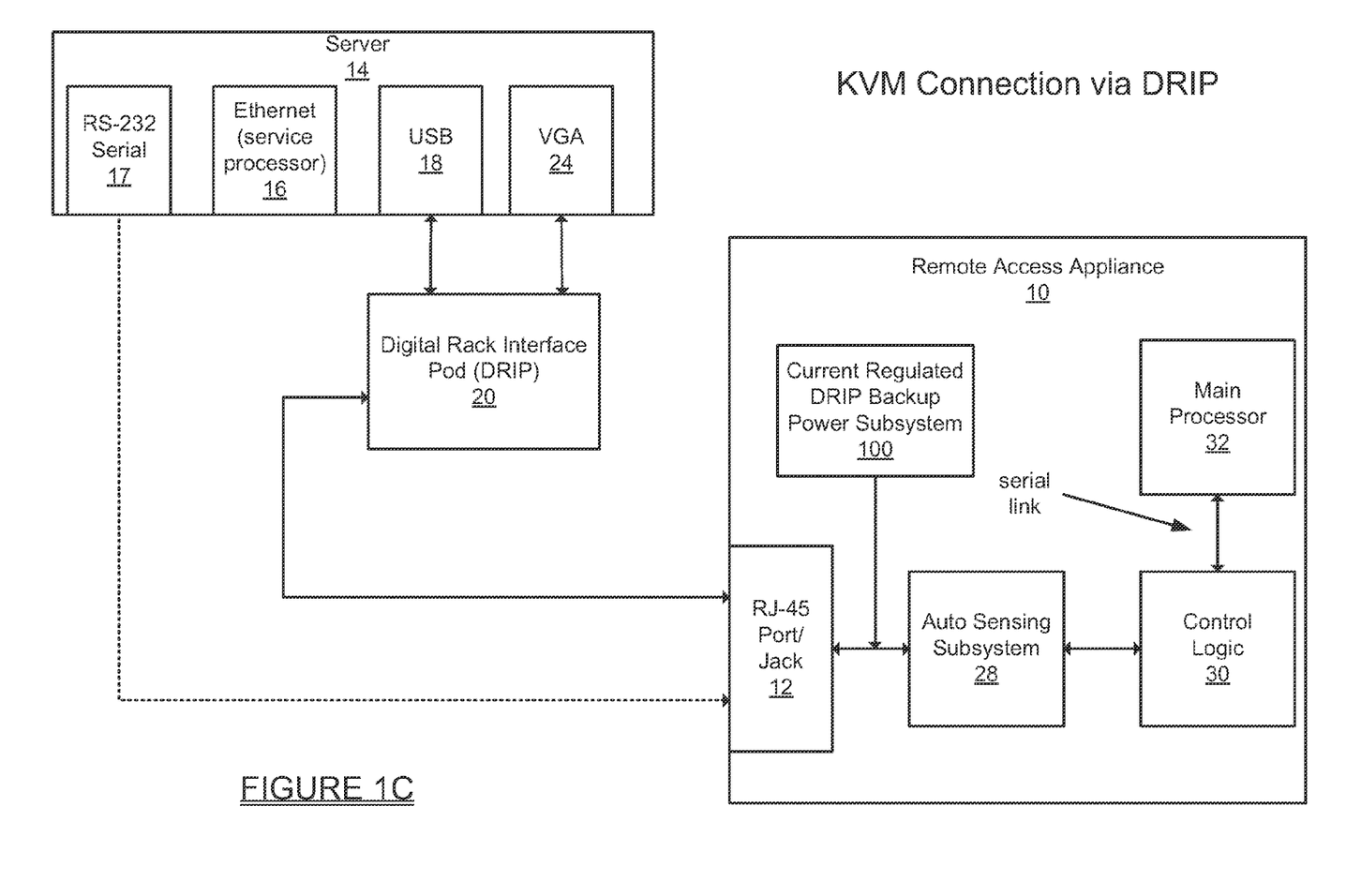

Referring to FIGS. 1A-1C, there is shown a remote access appliance 10 in accordance with one embodiment of the present disclosure. For convenience the remote access appliance 10 will be referred to throughout the following discussion simply as "appliance 10". The appliance 10 has a port shown as a RJ-45 port (i.e., jack) 12, which may be connected to a server 14 in at least three different ways. However, it will be appreciated that while the following discussion references a connection to a server, that the appliance 10 may be connected to many other types of devices. For example, many of the RS232 serial Avocent made appliance's connections are to other equipment than a server. Very common are connections to "smart" power strips made by Avocent Corp. and other manufacturers, and routers are very commonly connected to (either directly in an RJ-45 RS232 console or configuration port, or by way of a RJ to DB9 adapter). And, the appliance 10 would also typically support a serial console application at the remote user to operate with any other serial device. But again, for the following discussion, a connection between the appliance 10 and the server 14 will be used for explanation purposes.

FIG. 1A illustrates a first way in which a cable 17a, which is typically a Cat5 cable, is used to connect the RJ-45 port 12 of the appliance 10 to an RS-232 port of the server 14. This connection could also be made by using a RJ-45 to DB-9 adapter on the RJ45 cable end of the CAT5 cable from the appliance 10 to the server 14, such that the server doesn't have to have an RJ-45 interfaced serial port.

FIG. 1B illustrates a second way in which a cable 16b, typically a Cat5 cable, is used to connect the RJ-45 port 12 to an Ethernet port 16 of the server 14. Typically this type of connection enables the server's Service Processor (SP) to communicate various types of relevant information on the performance of the server (e.g., processor utilization, temperature, etc.) to the appliance 10 using the Ethernet communications protocol. In this configuration there is only the Cat5 cable between the port of the appliance 10 and the Ethernet port 16 that is associated with the service processor of the server 14. It should also be understood that the "Ethernet (service processor) 16" interface is only Ethernet by way of protocol, and is not the server's 14 main Ethernet interface. That is, this interface is only for the purpose of a subsystem (i.e., the Service Processor) on the server 14 that monitors the "health," performance, total utilization (CPU bandwidth, RAM, etc.), temperatures, etc. relating to the server 14.

FIG. 1C shows a third type of connection that involves the use of a digital rack interface pod ("DRIP") 20. The DRIP 20 may be coupled via a cable 20a to the RJ-45 port 12 of the appliance 10. The DRIP 20 may also be coupled via a suitable cable 26 to a universal serial bus (USB) port 18 of the server 14, and via a suitable cable 22 to a VGA port 24. The USB port 18 enables keyboard and mouse related information to be transmitted to and from the server 14 in serial form. The DRIP 20 is available from Avocent Corp. of Huntsville, Ala. The DRIP 20 operates to digitize video signals from the VGA port 24 of the server 14 and to place same in Ethernet form for transmission to the appliance 10. The DRIP 20 also functions to convert serial format signals from the USB port 18 to Ethernet format. The appliance 10 also may include an autosensing subsystem 28, a control logic subsystem 30 a main processor 32, and a current regulated DRIP backup power supply 100, to be discussed in the following paragraphs in connection with FIG. 4.

As will be appreciated then, the appliance 10 may need to communicate using either Ethernet protocol signals or serial protocol signals via its RJ-45 port 12, depending on what type of device is communicating with the appliance. The appliance 10 provides the significant advantage of being able to automatically sense whether Ethernet protocol signals or serial protocol signals are being received at its RJ-45 port without any intervention from a data center individual. This is accomplished by the auto sensing subsystem 28 and the control logic subsystem 30 working in combination with the main processor 32. The autosensing subsystem 28 effectively monitors the signals received on the RJ-45 port 12 and, in connection with the control logic subsystem 30 and the main processor 32, automatically internally configures various electronic components so that communications can be appropriately routed and handled within the appliance 10.

One significant benefit of the above-described autosensing feature is a potential reduction in the number of ports that need to be included on the appliance 10. Another significant advantage of an "autosensing" port as described herein, is that the appliance 10 is able to determine what to configure to without being told whether the other device is serial, KVM alone (i.e., no service processor subbed out), service processor alone, or a combination of KVM and service processor. The advantage of having a switchable port (whether done by port autosensing or by manual configuration) is that with x number of ports on an appliance (e.g., 40), a user can add the next thing to connect to and so long as its one of the things supported (i.e., service processor alone, serial, KVM, or KVM and service processor), the user has a port available for the next device to be coupled to. Thus, the port autosensing feature can potentially enable a reduction of ports needed to support all things while expanding the connections on the appliance 10.

Figures 2, 3:
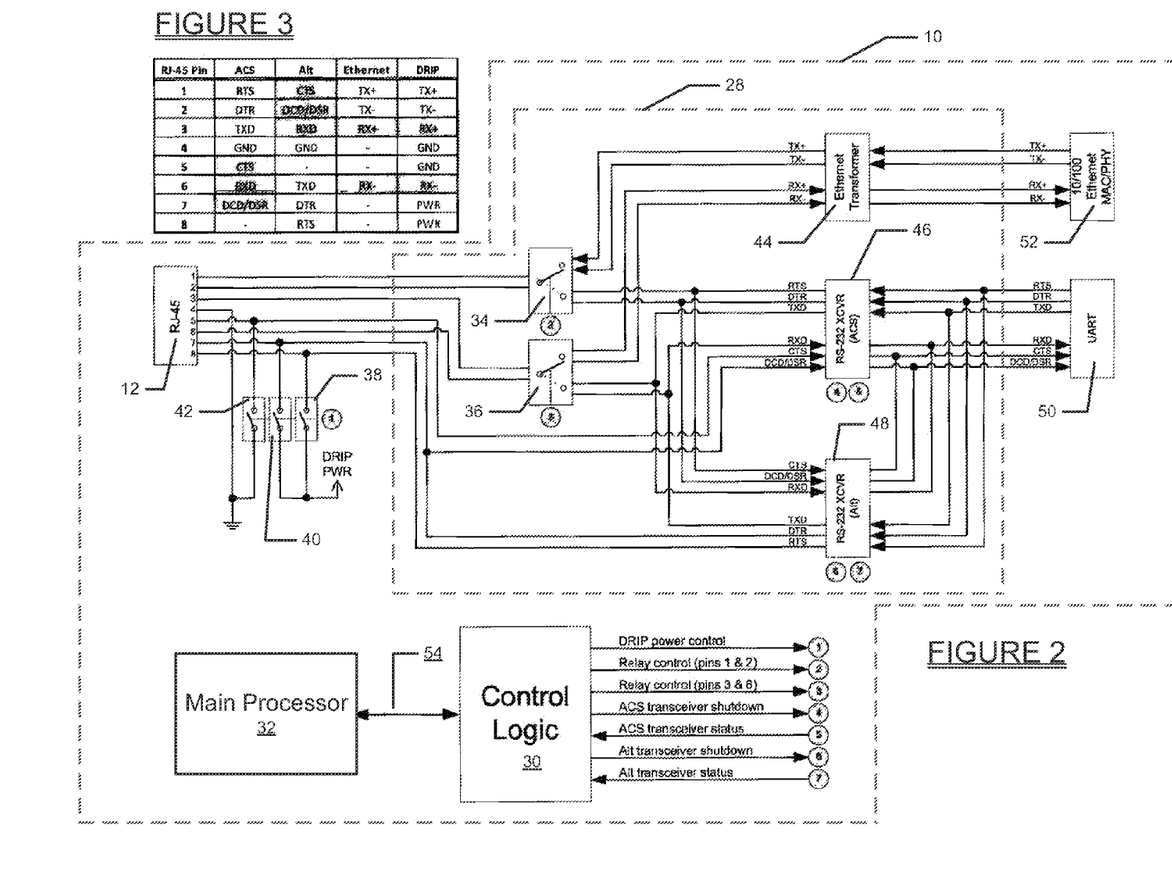
FIG. 2 is an electrical schematic diagram of an autosensing subsystem of the remote access appliance that detects whether an Ethernet or serial protocol device has been connected to a communications port on the remote access appliance via a communications cable, and also which is able to detect which one of two predetermined pinouts for the plug of the cable is being used when the cable is transmitting information to and from the remote access appliance using a serial protocol.
FIG. 3 is a table showing the pinout configuration of the RJ-45 jack on the remote access appliance when a serial connection is established with a serial device using an ACS pinout, when a serial connection is established with a serial device using an alternative ("Alt") serial pinout, when a connection is established with an Ethernet device, and when a digital rack interface pod ("DRIP") is coupled to the RJ-45 jack.

Referring now to FIG. 2, a schematic diagram of a portion of the appliance 10 is shown that illustrates in greater detail the autosensing subsystem 28 and the control logic subsystem 30. The autosensing subsystem 28 is denoted by a dashed line. A first semiconductor relay 34 is coupled to pins 1 and 2 of the jack that forms the RJ-45 port 12. A second semiconductor relay 36 is coupled to pins 3 and 6 of the same jack. A plurality of transistor switch paths 38 and 40 may be incorporated for coupling DC power to the DRIP 20 and transistor switch path 42 may be provided for providing an additional ground path for the DRIP (additional to that of the always-present ground path on RJ-45 port 12 pin 4). The first semiconductor relay 34 is coupled to an Ethernet transformer 44 and a first RS-232 transceiver 46. The first RS-232 transceiver 46 in this example is adapted to be used when a serial connection is made at the RJ-45 jack 12 with the mating RJ-45 plug having an ACS pinout configuration. The ACS pinout configuration is a pinout configuration recognized in the industry and used by Avocent Corp. on the serial ports of various forms of data center equipment available from Avocent Corp. A second RS-232 transceiver 48 is incorporated and designated with the notation "Alt", which is used for serial devices that require a different, predetermined pinout configuration. The specific Alt pinout configuration given in the Table of FIG. 3 is used for various serial devices made by Cisco Corp. and others. It will be appreciated that other pairs of pinouts may potentially be incorporated, and the present disclosure is not limited to use with any two specific pinout configurations.

As will be explained in greater detail in the following paragraphs, it is also a significant benefit that the autosensing subsystem 28 is able to automatically detect whether the ACS pinout or the Alt pinout is being used with the RJ-45 plug (and thus with the external serial device) that is connected to the RJ-45 port 12. This feature will also be described in greater detail in the following paragraphs. The ACS and Alt pinouts are shown in the table of FIG. 3 along with a pinout for an Ethernet connection and a pinout used by an Avocent Corp. manufactured DRIP 20.

Referring further to FIG. 2, both of the RS-232 transceivers 46 and 48 are coupled to a universal asynchronous receiver/transmitter (UART) 50, and the Ethernet transformer 44 is coupled to a 10/100 Ethernet/MAC/PHY interface subsystem 52. Numbers 1 through 8 at various ones of the above-mentioned components indicate where control signals from the control logic subsystem 30 may be applied as well as which components may transmit signals to the control logic subsystem 30. An important feature of the RS-232 transceivers 46 and 48 is their ability to sense when a valid RS-232 input voltage is present at any of their pins. For this purpose, one specific model of RS-232 transceiver that is especially well suited for the present application is a 3Driver/5 Receiver SP 3243E "intelligent" RS-232 transceiver available from several vendors as drop in replacements for one another. The vendors and models include Maxim MAX3243, Texas Instruments MAX3243, Sipex SP3243, Intersil ICL3243, and Exar SP3243E. This specific model of RS-232 transceiver, that will be referred to as the "model 3243" type of transceiver, has a "Status" output (pin 21 on the SP3243E RS-232 transceiver) that indicates whether a valid RS-232 voltage is present at any of its input pins. This detection feature was principally intended for low power applications where it is desired to power down the RS-232 transceiver when no serial cable is plugged into the serial port that is in communication with the RS-232 transceiver. The operation of the present appliance 10, however, takes advantage of the fact that normal 10/100 Ethernet voltages fall outside (i.e., below) the range of valid RS-232 signal levels. Accordingly, the "Status" output pin of the SP3243E RS-232 transceiver will not falsely detect Ethernet signals as valid RS-232 signals, as the voltages associated with the Ethernet signals will be below those of valid RS-232 signals. This feature allows use of the RJ-45 port 12 to bidirectionally communicate Ethernet signals to and from the appliance 10 without the two RS-232 transceivers 46 and 48 recognizing the presence of the Ethernet signals and falsely interpreting the Ethernet signals as RS-232 signals.

Referring further to FIG. 2, the two semiconductor relays 34 and 36 are shown in their default positions (i.e., in Ethernet "mode"). Power to the DRIP 20 is disabled as a result of transistor switch paths 38-42 being in the positions shown in FIG. 2. Pins 1, 2, 3 and 6 from the jack that forms the RJ45 port 12 are connected to the Ethernet transformer 44. Both of the RS-232 transceivers 46 and 48 will be shut down. No signals will be present on pins 5, 7 and 8, and pin 4 is tied to ground. If the DRIP 20 is the component which is coupled to the RJ-45 port 12, then the DRIP 20 will receive power from the USB port of the device, which in one example could be the USB port 18 of server 14 as shown in FIG. 1. The main processor 32 will virtually immediately recognize that an Ethernet device (i.e., the DRIP 20) has been connected to the RJ-45 port 12 as it starts communicating with the DRIP 20. In a very short time period (typically within several seconds) the main processor 32 will recognize that the Ethernet device is the DRIP 20, and will then provide a control signal to the control logic subsystem 30 that closes transistor switch paths 38 and 40, as well as transistor switch path 42. This causes DC power (typically +10.8 volts) to be applied to pins 7 and 8 of the RJ-45 port 12 to be used by the DRIP 20 if needed, and supplies an added ground return path (in addition to that of the hard-strapped RJ-45 pin 4 ground return path) on pin 5 of the RJ-45 port 12. If the session with the DRIP 20 ends for any reason (e.g., the DRIP 20 is unplugged from the RJ-45 port 12), then the main processor 32 will automatically and virtually immediately signal the control logic subsystem 30 to turn off power to the DRIP 32 by deactivating transistor switch paths 38, 40, and 42. This interrupts the application of DC power to pins 7 and 8 of the RJ-45 port 12 and interrupts the ground path to pin 5. Those pins 7, 8, and 5 of RJ-45 port 12 will then see an open circuit of high impedance, with regard to the DRIP powering circuitry of the appliance 10.

If the DRIP 20 is physically connected to the jack that forms the RJ-45 port 20 but there is no Ethernet activity detected to be occurring on the RJ-45 port 12 (from the DRIP 20 or from any other Ethernet device), the main processor 32 will send an "autosense" command to the control logic subsystem 30. This causes the control logic subsystem 30 to turn off DRIP 20 power by deactivating transistor switch paths 38, 40, and 42, as well as to power down both RS-232 transceivers 46 and 48. The first semiconductor relay 34 will be left as shown in FIG. 2 connecting pins 1 and 2 of the RJ-45 port 12 to the Ethernet transformer 44. However, the control logic subsystem 30 will cause the second semiconductor relay 36 to be switched to a "serial mode". This couples pin 3 of the RJ-45 port 12 to the TXD pin of RS-232 transceiver 46 and to the RXD pin of RS-232 transceiver 48. It also couples pin 6 to the RXD pin of the RS-232 transceiver 46 and to the TXD pin of the RS-232 transceiver 48. The main processor 32 will then check the status signals from the RS-232 transceivers 46 and 48 to look for the presence of valid RS-232 voltage level signals on the RXD or TXD pins of either RS-232 transceiver 46 or 48.

If the main processor 32 detects the presence of a valid RS-232 voltage level signal on the RS-232 transceiver 46, which means a valid RS-232 level signal on pin 6 of the RJ-45 port 12 is present, this indicates that a connection has just occurred with a serial device having an ACS pinout. The main processor 32 then enables (powers up) the RS-232 (ACS) transceiver 46 and generates a control signal to the control logic subsystem 30 to switch the semiconductor relay 34 to serial mode, as indicated in phantom in FIG. 2. This connects pins 1 and 2 of the RJ-45 port 12 with the RTS and DTR pins of the RS-232 (ACS) transceiver 46. Serial communications will then be fully enabled using the RS-232 (ACS) transceiver 46.

If the status signal from the RS-232 (Alt) transceiver 48 indicates that a valid RS-232 level voltage signal has been received on its RXD input via pin 3 of the RJ-45 port 12, then the main processor 32 powers up the RS-232 (Alt) transceiver 48 and generates a control signal to the control logic subsystem 30 that is used to switch the semiconductor relay 34 to the serial mode, which is shown in phantom in FIG. 2. In the serial mode pins 1 and 2 of the RJ-45 port 12 are connected with the CTS and DCD/DSR pins of the RS-232 (Alt) transceiver 48. Pins 3 and 6 of the jack forming the RJ-45 port 12 will be connected through the semiconductor relay 36 with the RXD pin and TXD pin, respectively, of the RS-232 (Alt) transceiver 48. Serial communications will then be fully enabled using the RS-232 (Alt) transceiver 48.

If both RS-232 transceivers 46 and 48 generate status signal outputs to the main processor 32 that indicates that valid RS-232 level voltage signals are being received on their inputs, then it is understood that an invalid serial pinout is being used on the RJ-45 plug that has been coupled to the RJ-45 port 12. In this instance both RS-232 transceivers 46 and 48 will be left powered down by the main processor 32.

If one or the other of the RS-232 transceivers 46 or 48 is operating but then the RS-232 level signals are lost, such as if the RJ-45 plug is removed from the RJ-45 port 12, then the main processor 32 sends a control signal to the control logic subsystem 30 that causes it to switch the semiconductor relay 36 back to the Ethernet mode (shown in solid lines in FIG. 2). The main processor 32 then waits for a short amount of time, for example 5 seconds, and then shuts down both of the RS-232 transceivers 46 and 48. Thereafter, the semiconductor relay 36 will be switched back to the serial mode (shown in phantom in FIG. 2) and the autosensing of the status outputs of both RS-232 transceivers 46 and 48 will continue until either an Ethernet signal is detected or a valid RS-232 voltage signal is detected, as described above.

It is important to note that the appliance 10 is able to distinguish between ACS and Alt serial pinouts because there are no RJ-45 pins that are inputs in both the ACS and Alt pin-out configurations. So only one of the two RS-232 transceivers 46 or 48 will detect valid RS-232 signal input levels when one or the other of the ACS or Alt pinouts is used.

If an Ethernet device is connected to the RJ-45 port 12, it will not be detected as a serial device, and the above described operational sequence will reach the implementation of the 5 second delay time. This delay time allows the Ethernet MAC/PHY 52 time to establish a link. When the main processor 32 sees an Ethernet link, it will tell the control logic subsystem 30 to stop autosensing and stay in Ethernet mode. At any point during the above described operations, the main processor 32 may query the control logic subsystem 30 to determine the state of the RJ-45 port 12 or to force it into a particular mode.

The autosensing feature of the appliance 10 thus provides a significant and highly advantageous means for monitoring and immediately detecting the presence of an Ethernet device or a serial device that has been connected to its RJ-45 port. An even further advantage is that the appliance 10 of the present disclosure is able to automatically sense the specific pinout (i.e., either an ACS or Alt pinout) of a serial device that has been connected to its RJ-45 port, and to accommodate the sensed pinout without the need for the data center individual to set any configuration switches on the appliance 10 or to otherwise take any other action. The ability to transmit both Ethernet and serial protocol signals over a single port can also allow the use of a single 1-U height appliance to be used in a rack and have the ability to flexibly build a connection system using only Cat5 cables (no dongle devices, RIPs or DRIPs) to any combination of Ethernet-interfaced service processor ports or RS232 ports of Alt or ACS pinouts. The serial ports can be used with other DB-connector-interfaced serial ports with RJ-45 to DB adapters. And, where KVM is needed, DRIPs may be used on any of the ports (as all support Ethernet) of the appliance 10, and can be installed initially or added in later in the case of using what was a service processor port.

Figure 4:
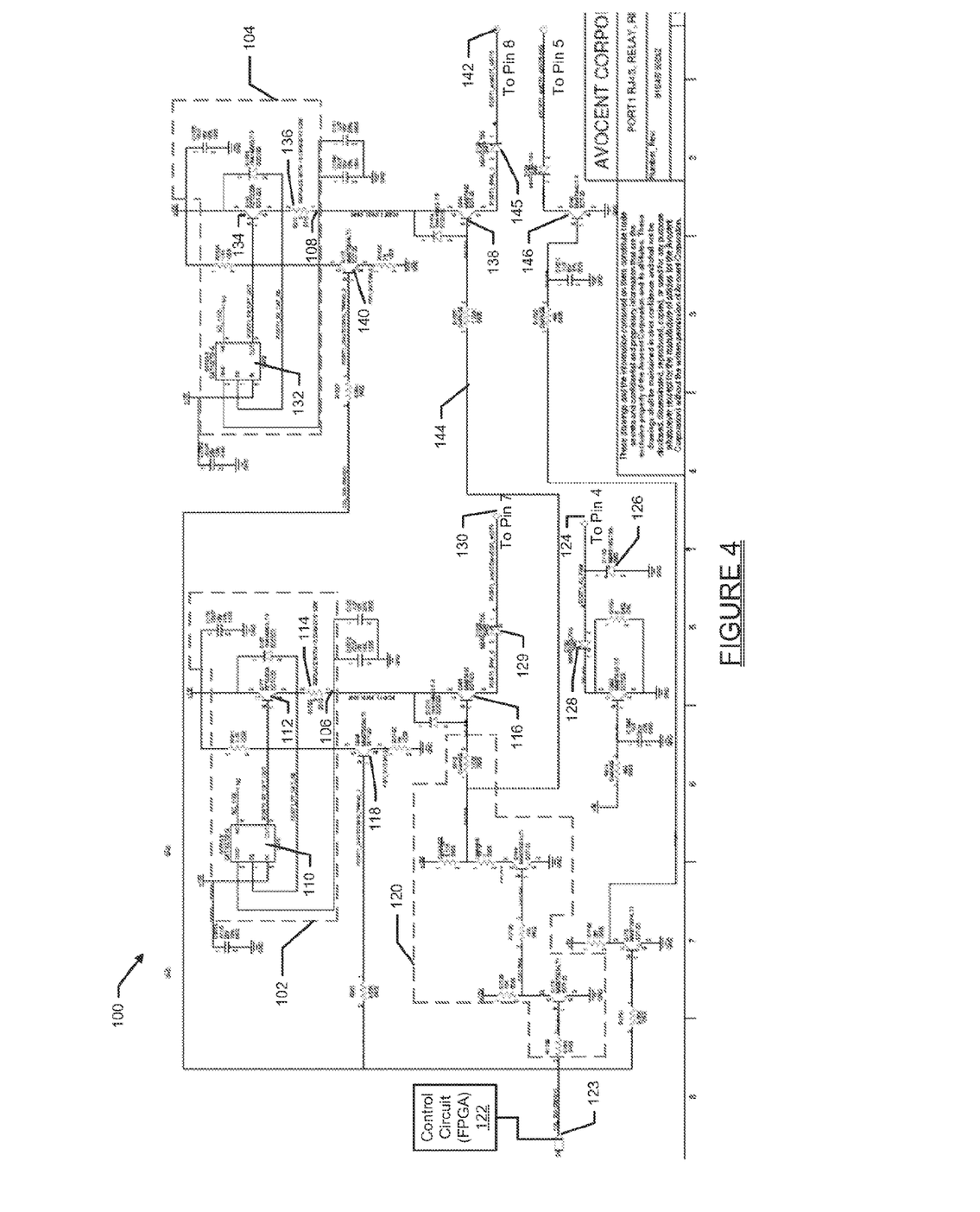
FIG. 4 is an electrical schematic diagram illustrating a power backup subsystem of the appliance that is able to automatically apply power to a DRIP if the DRIP loses its power from the serial port of a server while a session is in progress.

Referring now to FIG. 4, a backup power subsystem 100 of appliance 10 is shown. The backup power subsystem 100 is provided for generating a backup power source to the DRIP 20, and thus for the purpose of the following discussion it will be assumed that the connection scheme shown in FIG. 1C is being implemented. In other words, the DRIP 20 is interfacing the appliance 10 to the USB port 18 and the VGA port 24 of the server 14.

In the connection scheme of FIG. 1C, power will be drawn from the USB port 18 of the server 14 to power the DRIP 20 during normal operation. In the event the server 14 shuts down and the power from the USB port 18 is lost, the backup power subsystem 100 will provide sufficient power to maintain the DRIP 20 powered up, and thus maintain the existing session with the DRIP 20. To accomplish this the backup power subsystem 100 may incorporate a first shunt current regulator subsystem 102 (hereinafter simply "regulator subsystem 102") that generates an output at point 106 that is connected to pin 7 of the RJ-45 port 12 (i.e., the jack that forms the port), and a second shunt current regulator subsystem 104 (hereinafter "regulator subsystem 104") that generates an output at point 108 that is connected though transistor switch paths to pin 8 of the RJ-45 port 12. Pin 4 of the RJ-45 port 12 is tied to the appliance 10 digital ground through rectifier diodes for a return current path from the DRIP 20. Pin 5 of the RJ-45 port 12 is tied to the appliance 10 digital ground through a transistor switch path for a return current path from DRIP 20. In this example the construction of the two regulator subsystems 102 and 104 is identical, but they need not be identical.

The regulator subsystem 102 includes a precision shunt current regulator 110 (hereinafter "current regulator 110"), a first (pass through) transistor 112, and a current sensing resistor 114. The regulator subsystem 102 supplies current to a second (switching) transistor 116. A third (shutdown) transistor 118 (shown as an NPN transistor) is used to override normal regulation operation of the first transistor 112 for turning off the regulator's output of current entirely, which will be described in greater detail in the following paragraphs.

A biasing network 120, responsive to a signal from a control circuit 122, operates the switch transistor paths, turning on or off the voltage to the DRIP 20 from the appliance 10 at the RJ-45 port 12 by either allowing or shutting off the flow of current through the two send paths going to pins 7 and 8 of the RJ-45 port 12, as well as allowing or shutting off the flow of current through the one return path from pin 5 of the RJ-45 port 12. Pin 4 of the RJ-45 port 12 always allows a current return path, as it is used both as a ground in the RS232 operation of RJ-45 port 12 and the currently described DRIP 20 powering operation. In one implementation the control circuit 122 may comprise a field programmable gate array (FPGA). The signal from the control circuit 122 applied to circuit point 123 also controls on and off operation of the second transistor 116. In one specific form, a 3.3 v TTL/IO pin of the FPGA may be used that controls the control input to circuit point 123. Pin 4 of the RJ-45 port 12 is tied to circuit point 124, which in turn is tied to ground through a pair of Schottky diodes 126 and 128. Another Schottky diode 129 is at output 130, which is tied to pin 7 of the RJ-45 port 12. This prevents current from flowing back into the output 130.

The regulator subsystem 104 is essentially identical to regulator subsystem 102 in construction and includes a precision shunt current regulator 132 (hereinafter "current regulator 132"), a first (pass through) transistor 134, and a current sensing resistor 136. The regulator subsystem 104 provides current to a second (switching) transistor 138. A third (shutdown) transistor 140 (shown as an NPN transistor), responsive to signals from the control circuit 122 applied to its base, can override normal regulation of the first transistor 134 for turning off the regulator's output of current entirely. The second transistor 138 forms a switch to control the output current flowing to output 142, which is coupled to pin 8 of the RJ-45 port 12. The biasing of second transistor 138 is also controlled by the biasing network 120 via circuit line 144. A Schottky diode 145 is placed in series with the output 142 to prevent current from flowing into the output.

It will be appreciated that the operation occurring at regulator subsystem 104 and output 142 will be identical to that described above for regulator subsystem 102 and output 130. The current regulator 110 of the regulator subsystem 102, in one implementation, may comprise a CAT 102TDI-G precision regulator available from ON Semiconductor, Inc. of Phoenix, Ariz. The CAT 102TDI-G precision current regulator includes a built in comparator and generates a precision 0.6 v internal precision reference voltage that its internal comparator uses to control its output on pin 3 thereof.

Initially it will also be understood that since the backup power subsystem 100 is intended to only supply "backup" power to the DRIP 20, several conditions preferably exist before any power is applied by the backup power subsystem 100 to the outputs 130 and 142. During normal operation when the DRIP 20 is in use it will be drawing power from the USB port 18 of the server 14. This also lessens somewhat the burden on the power supply (not shown) of the appliance 10 during normal operation when the DRIP 20 is being used. A first required condition may be that before power is applied to outputs 130 and 142, that there be an Ethernet sync indication present in the Ethernet MAC/PHY of an Ethernet device. This sync indication is available to the CPU of the appliance 10 through query of that Ethernet device. Unless and until such an Ethernet sync signal is present, the backup power subsystem 100 will preferably not apply power to the outputs 130 and 142, and would not switch in a ground return path on the RJ-45's pin 5 (through transistor 146). A second condition that preferably is present before the backup power subsystem 100 begins applying power to the DRIP 20 is that there has been a confirmation by the appliance 10 that the DRIP 20 is actually the component that is coupled to the RJ-45 port 12 of the appliance 10. That confirmation may be in the form of receipt of embedded code from a processor or other component within the DRIP 20 that is received and recognized by the main processor 32 of the appliance 10. Such code will confirm to the appliance 10 that it is in fact the DRIP 20 that is actually coupled to its RJ-45 port 12 and not some other type of Ethernet device. Lastly, the third condition that preferably exists is that there be a KVM remote session in progress involving a remote user using the appliance 10 and DRIP 20 to access the server attached to DRIP 20. This could happen with a user at the appliance 10 using a local access, but would most commonly occur with a remote user over an Ethernet and/or internet connection using remote access software that accompanies the appliance 10. Preferably the remote user will be logged in to the appliance 10 and will be using the DRIP 20 to communicate information between the KVM/ USB interface of the DRIP 20 and the server 14. Preferably only when these three conditions are all present will the backup power subsystem 100 of the appliance 10 begin applying power to pins 7 and 8 and switch in the ground return path on pin 5 of the RJ-45 port 12 on the appliance 10.

The voltage that will be output to pins 7 and 8 of the RJ-45 port 12 should preferably be sufficiently large to overcome the line losses that may be expected to occur over the length of the cable (in this example over the "Send" and "Return" wires of a Cat5 cable) that is being used to couple the DRIP 20 to the RJ-45 port 12 of the appliance 10. The length of such a cable may extend up to an industry standard of 330 feet (about 100.5 meters). It is preferred that the output voltage at pins 7 and 8 of the RJ-45 port 12, relative to ground, will preferably be somewhat less than +12 volts, and in this example that voltage will preferably be about +10.8 volts. This is achieved by the four voltage drops across the first transistor 112, the current sensing resistor 114, the second transistor 116, and the diode 129 as they relate to output 130, and also by the four voltage drops across components 134, 136, 138 and 145. The +10.8 volt output produced is anticipated to be ample to compensate for anticipated line losses in the Cat5 cable, even when the cable extends up to 330 feet in length, while still being below a the clamp voltage determined by a set of protection device's (ESD/clamp diodes) that are referenced to a +12 volt chassis voltage being supplied by a supply (not shown) of the appliance 10. The clamp voltage is highly desired to protect the previously mentioned model 3243 RS232 transceivers, for both electrostatic discharge (ESD) and for some RS232 levels that could legally be transmitted into the RJ-45 port 12 from serial devices that could be connected to the RJ-45 port 12 (but, while adhering to the upper voltage of the RS232 spec, the RS232 voltages could be of a great enough magnitude to potentially damage the model 3243 RS232 transceivers). Dropping the output of the voltage used to back power the DRIP 20 from the appliance 10 below the positive direction clamp voltage achieved with clamp diodes and a +12 v potential to clamp to prevents a constant clamping of the DRIP 20 back-powering voltage put out on the RJ-45 Port 12, pins 7 and 8. This +10.8 volt backup supply voltage also leaves sufficient "headroom" in the backup supply voltage at the DRIP 20 so that the backup supply voltage can be regulated down to a lesser, suitable supply voltage by an internal voltage regulator circuit within the DRIP 20.

Turning now to operation of the backup power subsystem 100, it will be assumed that the three conditions described above are in place and that the backup power subsystem 100 is generating a backup power signal to pins 7 and 8 of the RJ-45 port 12 (i.e., at outputs 130 and 142). The first transistors 112 and 134 will each be in saturation, the second transistors 116 and 138 will both be turned on as a result of the signal being applied by control circuit 122 to point 123. The third (i.e., shutdown) transistors 118 and 140 will both be non-conducting at this point. Transistor 146 will also be in a conducting state as well via a signal from the control circuit 122 applied at circuit point 123, thus coupling pin 5 of the RJ-45 port 12 to ground. Pin 4 of the RJ-45 port 12 will be tied to ground via the Schottky diodes 126 and 128 that are connected to circuit point 124. Pin 4 is tied to ground whether the appliance 10 is operating strictly with a serial connection to some external serial device or operating with the DRIP 20. In effect, pin 4 is rectified to ground for serial operation by the use of the two Schottky diodes 126, 128 configured as shown. Pin 4 of the RJ-45 port 12 and the transistor switched in path of pin 5 of the RJ-45 Port 12 form return paths for current being used to power the DRIP 20 when the DRIP 20 is actually drawing power from the backup power subsystem 100. Schottky diodes 126 and 128 form a full wave rectifier for RS232 currents on RJ-45 port 12 pin 4, such that return currents can be either positive or negative in direction of flow. This satisfies the direction of flow needed on pin 4, and path, for both RS232 currents and DRIP 20 power return currents. This configuration is always in place for RJ-45 port 12 pin 4, regardless of what the operation of RJ-45 Port 12 is. That operation includes RJ-45 port 12 being in a service processor Ethernet mode of operation, a KVM mode of operation (with back power on or not), or if that RJ-45 Port 12 is in a serial mode of operation. RJ-45 port 12 pin 5's return path need only deal with the one direction of current flow that it satisfies with the one diode between pin 5 and transistor 146, and the transistor 146, as that pin 5 is only ground for the one mode of KVM and DRIP back powering.

When the DRIP 20 loses its primary power from the USB port 18, it will then start drawing current from pins 7 and 8 of the RJ-45 port 12 (i.e., from outputs 130 and 142). The backup power subsystem 100 provides the advantage that it allows a slight "surge" of current beyond the designed for 100 ma output from each of pins 7 and 8. This is due to the regulators 102 and 104 being shunt regulators that provide constant current past their set point of shunting (100 mA in this case), and any additional loading that would desire greater current will cause a drop in the output voltage of the regulators (and ultimately the outputs of 130 and 142 to RJ-45 port 12 pins 7 and 8, respectively). As the DRIP 20 starts drawing current, the current regulators 110 and 132, the first transistors 112, 134 and the current sense resistors 114, 136 allow the current being drawn by the DRIP 20 to rise momentarily above a predetermined maximum current set by the value of the sense resistors 114, 136 and each regulator circuit's +0.6 v precision reference voltage that these reference voltages are being compared to by the internal comparators. The current being drawn then settles down at some value below the predetermined maximum current in a normal operating DRIP 20 powering scenario. In this example the sense resistors are each shown as 6 ohm resistors, which provides an output current at each of pins 7 and 8 of the RJ-45 port 12 of up to 100 ma (i.e., on each "Send" wire of the Cat5 cable). If an output current of 200 ma is desired at each of pins 7 and 8, then the sense resistors 114, 136 may be changed to 3 ohms. A current of 100 ma per each Send wire of the Cat 5 cable provides the DRIP 20 with up to about 1 watt of power that it may draw, with max cable length (with max drops of line loss in each direction), before the shunt operation of the current regulators 110, 132 begins to shunt voltage while maintaining the max current being drawn. However, it is anticipated that most DRIPs designed to work with this system will require 1 watt or less for operation in low-power mode (while being back-powered). So, even at the max specified operational length of 330 ft of Cat5 cable between the appliance 10 and DRIP 20, 1 watt will be sufficient to maintain the DRIP 20 powered on in low power mode after the USB power is lost. To provide 1 watt at the load of the DRIP 20, the maximum power available from the current regulators 110, 132 to the DRIP 20 is selected such that the DRIP 20 is only able to implement a desired "low power mode" of operation where only some limited functionality is provided for the DRIP 20. The regulators are able to be changed to allow for greater values of current allowed to the DRIP 20 by a change in the sense resistor values at 114 and 146, were there to be a desire for that later. So while the limited functionality of the DRIP 20, while it is being back powered from the appliance 10, may give up some performance capabilities (e.g., KVM video sampling), the DRIP 20 nevertheless stays powered up. The DRIP 20 is able to turn on the KVM video sampling so quickly that, when the USB power from the server 14 does comes back on, the video of the BIOS screen will be caught.

When the current being drawn by the DRIP 20 rises to a maximum level greater than what was agreed upon (and what the resistor 114 and 146 settings allow for without shunt regulation occurring), in this example enough greater than the shunt setting of 200 ma total from the two current regulators 110, 132 that the shunting begins occurring, then the internal transistor in each current regulator will start to pull out of saturation. It will pull out of saturation gradually, if the load applied by the DRIP 20 increases gradually, or it will do so abruptly if the load applied by the DRIP 20 increases abruptly. As the load increases past the 100 ma limit per regulator, the voltage at the emitter of each first (i.e., pass) transistor 112, 134 will begin to drop. The drop will be gradual if the increase in load is gradual and abrupt if the increase in load is abrupt. The more load that the current regulator 110, 132 sees, all the way up to a short circuit condition, the more that the emitter voltage will drop on the first transistors 112, 134, until the emitter voltage of each first transistor 112, 134 goes to virtually zero. And at that lowest output voltage from transistor 112, 134, there will still be the maximum shunt current being supplied to the DRIP 20. That is, in this short circuit condition, if there is only 1 v or less output 112, 113, and so out of pins 7 and 8 of RJ-45 port 12, there is still the 100 mA per each of pins 7 and 8 being supplied to the shorted condition on those pins. However, the result of this approach is that any usable power will be essentially turned off to 7 and 8 of the RJ-45 port 12 if a short circuit condition occurs in the DRIP 20. The DRIP 20 cannot use the small amount of voltage present at the RJ-45 port 12, or at DRIP 20 end of the Cat5 cable (which would be even less in potential), to create its voltage rails for operation, regardless of the current available at the DRIP 20, when the regulators have fully shunted their voltage outputs in appliance 10. If the short circuit condition goes away gradually, power to the DRIP 20 will be returned gradually (and eventually can become usable power to the DRIP 20), and if the condition releases from being shorted abruptly, the power available to the DRIP 20 will be returned to totally usable power just as abruptly.

Now consider the situations where the DRIP 20 is connected to the RJ-45 port 12 and operating normally (i.e., being powered by the USB port 18 of the server 14), or whether the DRIP 20 is being powered by power from the backup power subsystem 100. In either situation, if the DRIP 20 is then unplugged from the RJ-45 port 12, this condition will be sensed virtually immediately by the main processor 32 (FIG. 1) by the loss of the Ethernet session with the DRIP 20 (from seeing a loss of sync in the MAC/PHY that is used in the appliance 10 for RJ-45 port 12's Ethernet operation). The main processor 32 communicates this condition to the control circuit 122. The control circuit 122 applies a signal to circuit point 123 so that current flow to pins 7 and 8 of the RJ-45 port 12 is interrupted virtually immediately. This is accomplished by the signal applied to circuit point 123 turning off switch transistors 116, 138, 146, thru the biasing network of 120. Also, the regulator's "turn-off" transistors 118 and 140 are driven to saturation (i.e., turned on), which pull out of saturation completely the current regulator's pass transistors 112 and 134. The minimum of those transistors just mentioned required to change state to turn off of DRIP powering would be switch transistors 116, 138, and 146. The added shut down of the regulators is included as an added precaution with no appreciable added cost. The action of turning off the transistors 116 and 138 quickly interrupts current flowing to circuit points 130 and 142, and thus virtually immediately removes power from pins 7 and 8 of the RJ-45 port 12. As such, there is no reasonable possibility of an individual inadvertently damaging some external device by unplugging the DRIP 20 from the Cat5 cable and then plugging the Cat5 cable in to a different component, or unplugging the Cat5 cable from the appliance's 10 RJ-45 port 12 and plugging in a cable connected to some other device.

Finally, and as mentioned above, no power will be applied to pins 7 and 8 of the RJ-45 port 12 until the three above-explained, predetermined conditions are present (i.e., DRIP 20 plugged in to RJ-45 port 12 with and its identity recognized by the main processor 32 and a session in progress). During this state the two shutdown NPN transistors 118 and 140, will be turned on, which turns off completely the pass transistors 112 and 134. And switch transistors 116, 138, and 146 are all turned off. Only when the three predetermined operating conditions with the DRIP 20 are satisfied will (1) the shutdown transistors 118 and 140 be turned off and (2) the switch transistors 116, 138, and 146 be turned on, thus allowing voltages to be developed at outputs 130 and 142.

From the above it will be appreciated that the backup power subsystem 100 forms a highly effective means for providing backup power to the DRIP 20 in the event the DRIP 20 should lose power from the USB port 18 of the server 14 while an Ethernet session is taking place, such as when the server goes down. This is a significant advantage as it allows a user to still use the DRIP 20 to maintain the user's Ethernet session, and thus to maintain communications with the server 14 remotely via the appliance 10 when the server 14 is re-booting. Of particular importance, this feature allows the user to see the BIOS screen generated by the server 14 as it re-boots. The backup power subsystem 100 is also highly advantageous in that it virtually immediately removes backup power being applied at pins 7 and 8 of the RJ-45 port 12 in the event that a session with the DRIP 20 is lost for any reason (such as if the DRIP 20 is unplugged from the appliance 10). Still further, the backup power subsystem 100 will not apply any backup power to the pins of the RJ-45 port 12 unless the main processor 32 has verified that it is communicating with the DRIP 20 and an Ethernet session is in progress. These additional safeguards ensure that there is virtually no chance that the backup power supplied by the appliance 10 can be inadvertently applied to some other component besides the DRIP 20.

The ability to provide backup power to the DRIP 20 also may enhance the ease with which code upgrades may be loaded into the DRIP 20. For example, it may be possible to program the DRIP 20 such that it is able to be powered up in a limited functionality (i.e., "low power") mode by the appliance 10 when it is just coupled to the appliance 10. In other words no connection at all would be made between the DRIP 20 and the server; the DRIP 20 would simply be coupled with a Cat5 cable or other cable from an output port of the appliance 10. Then code could then be loaded into the DRIP 20 from the appliance 10. It is possible that the DRIP 20 could also be configured to allowing initial flashing of one or more internal programmable memory components through this technique.

It will also be appreciated that if the DRIP 20 is constructed with a feature of reporting back to the appliance 10 the fact that is has begun drawing power from the appliance 10, then the appliance could readily include a power budgeting feature by which the appliance 10 will only power on up to a predetermined number of DRIPs 20. This will prevent the possibility of overtaxing the appliance's 10 chassis power supplies if the total of DRIPs 20 that started drawing backup power from the appliance 10 simultaneously added up to more power than the appliance's chassis power supplies could sustain as added load to them (without derating the lifespan of the chassis power supply). This approach ensures there would be no chance that the chassis power supplies of the appliance 10 is inadvertently overloaded. If all of the DRIP 20 devices connected to an appliance 10 draw low enough current to be sustained (all of them at once), then budgeting the maximum number isn't as important. However, if it's desired later to increase the current limit at the shunt regulators 102 and 104 from 100 mA per wire to a greater amount, such as to allow full power mode at the DRIP 20 devices, the entire description of the system in this document can still accommodate that. With a change in the value of the current sense resistor 114, 136 to allow more current prior to shunt operation, the current per outputs 130 and 142 could be carried up to 200 mA for send current (providing a total of 400 mA received out of two of the Cat5 wires at the DRIP 20). With that one change, all the logistics of when to turn on or off power that have been described in this document remain the same. But, budgeting how many DRIP 20 devices are on allows for the ability to run several DRIP 20 devices in this new example's full power mode (pulling twice or more the low power mode consumption of 1 W) on multiple ports of the appliance 10. This ability to budget how many of these DRIP 20 devices there are, and what they should be consuming in power from the main chassis supplies, allows for the appliance 10 to determine how many DRIP 20 devices it can allow to have power prior to overtaxing the chassis power supplies. The allowing or disallowing of full power to the DRIP 20 devices would occur on a port-by-port basis by the appliance 10 turning on or off the backup power subsystem 100 associated with each of those ports (as described previously). And, this was done without adding current draw monitoring devices (on pins 7 and 8 of RJ-45 Port 12), per each of the Port 12 ports of the system in the appliance (for determining the total system current). This approach allows for significant cost savings in the process of power budgeting the DRIP 20 powering system.

Figure 5:
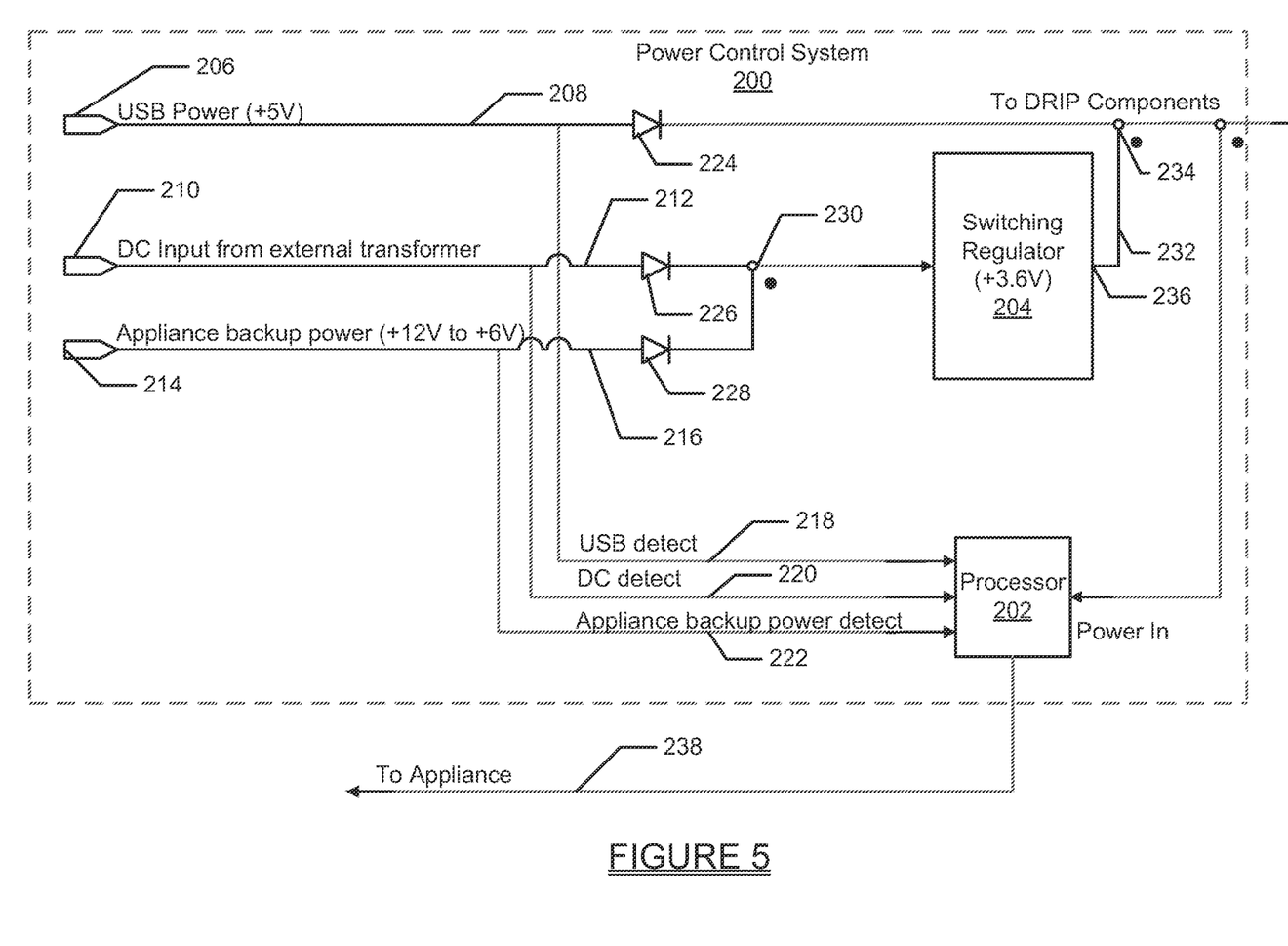
FIG. 5 is a diagram of one embodiment of an intelligent power control system that the DRIP may incorporate to intelligently prioritize the use of a plurality of different power sources.

Referring now to FIG. 5, there is shown an intelligent backup power switching control system 200 in accordance with one embodiment of the present disclosure. For convenience, the intelligent backup power switching control system will be referred to throughout the following description as simply the "control system 200".

The control system 200 may include a processor 202 and a switching regulator circuit 204 (hereinafter simply the "regulator" 204) in communication with the processor 202. In one embodiment the regulator may comprise an ADP 2301 switching regulator available from Analog Devices, Inc., of Norwood, Mass. A USB power input port 206 may receive USB power from the server 14 and apply the power to a first circuit line 208, a DC power input port 210 may receive a +12V to +6V power supply signal from a conventional, external step down transformer (not shown) and apply it to a second circuit line 212. An input port 214 may receive backup power from the appliance 10 once the three above discussed conditions are satisfied, and apply the power to a third circuit line 216. In this example the power control system 200 output may preferably be between about +4.6V to about +3.6V, which is sufficient to power the DRIP 20.

A circuit detect line 218 provides a "USB Detect" signal to the processor 202 to let the processor know when USB power has been detected. A "DC Input Detect" circuit line 220 provides an input to the processor 202 to let the processor know when a DC input signal from the external transformer has been received. An "Appliance Backup Power Detect" circuit line 222 provides a signal to the processor 202 to let the processor know when the appliance 10 has generated a power signal to the DRIP 20.

A diode 224 is placed in series in the first circuit line 208. A second diode 226 is placed in series in the second circuit line 212, and a third diode 228 is placed in series in the third circuit line 216. Diodes 226 and 228 have their cathodes tied together at point (i.e., node) 230 and together form a diode-OR arrangement. Diodes 224, 226 and 228 prevent any leakage of current from an active circuit line (208, 212 or 216) to an inactive circuit line. An output circuit line 232 is tied to the first circuit line 208 at point (i.e., node) 234 and to an output 236 of the regulator 204. The diode 224 is further located to be between the input port and the circuit point 234. Output circuit line 232 receives the output from the regulator 204 which in this example may be about +3.6V.

In operation, when power is available from the USB port 18 of the server 14, then about +4.6V will be present on first circuit line 208 after the voltage drop by diode 224. Even if DC power is available at input port 210 from the external transformer, the regulator 204 will remain in an idle state because the voltage on circuit line 208 (+4.6V) will be higher than the +3.6V output of the regulator 204. Consequently, only power supplied from the USB port 18 of the server 14 will be used to power the DRIP 20.

The processor 202 monitors the detect lines 218, 220 and 222, and as long as it does not detect DC power being present on input port 210 (via a signal from DC detect circuit line 220), it will communicate with the main processor 32 of the appliance 10 on circuit line 238 to inform the main processor 32 in the appliance 10 that backup power from the appliance 10 may be supplied to the DRIP 20, provided no power is yet being received from the appliance 10. As soon as the appliance 10 starts generating backup power to the DRIP 20, this condition will be detected by the processor 202 via the appliance backup power detect line 222.

The second circuit line 212 (external DC power) and the third circuit line 216 (appliance backup power) are treated as being mutually exclusive. The availability of power from second circuit line 212 is not under software control. However, the availability of power on third circuit line 216 (appliance backup power) is under software control. By "software control" it is meant that software running in connection with operation of the processor 202 controls when the processor 202 generates a message on circuit line 238 that informs the appliance 10 when power may be applied to input port 214. It will be appreciated that the input port 214 will be tied to pins 7 and 8 of the RJ-45 port 12 of the appliance 10 via a suitable cable, for example a Cat5 cable. Only when power is not present on input port 210 will the DRIP 20 generate the signal on circuit line 238 to inform the appliance 10 that power may be applied to input port 214. And as described hereinbefore, the appliance 10 preferably only generates output power on pins 7 and 8 of the RJ-45 port 12 after verifying that it is the DRIP 20 that is the Ethernet device that it is communicating with.

If the processor 202 detects, via DC detect line 220, that DC power has become available on second circuit line 212, while power is detected via detect line 222 as being available on the third circuit line 216, then the software operating with the processor 202 will send a signal via circuit line 238 to the appliance 10. In this instance the appliance 10 may respond by turning off the power that is being applied to input port 214 of the DRIP 20. If in some rare instance both input ports 210 and 214 were to receive power simultaneously, this would not cause any problems. Whichever of the circuit lines 212 and 216 has the higher of the two voltages will be the one that will supply power to the regulator 204. The output of the regulator 204 would still be at its set value of about +3.6V.

In effect, the regulator 204 only provides DC power when power from the USB port 18 of the server 14 is lost, or not present, on input port 206, and power is present on either input port 210 or input port 214. But as explained above, power typically will not be present on both of input ports 210 and 214 but rather on one or the other.

In the event power is present on input port 206 and powering the DRIP 20, and then this power is lost, the voltage at node 234 will begin dropping from +4.6V. It will continue to drop until it reaches the +3.6V level set for the regulator 204, at which point the regulator 204 will begin operating and generating its +3.6V output. The regulator 204 will maintain the +3.6V output present as long as a DC signal is being received at one or the other of input ports 210 and 214. If power should again become available from input port 206 (as detect by detect line 218), the voltage at node 234 (and consequently regulator 204 output 232) will begin to rise from +3.6V to +4.6V. As the voltage rises above +3.6V the regulator will automatically enter an idle state, and the +4.6V DC signal from the USB port 18 of the server 14 will be used to power the various components of the DRIP 20.

A particular advantage of the operation of the regulator 204 and the processor 202 is that a change from one power source to a different power source is non-disruptive to system functionality. By non-disruptive, it is meant that the processor 202 does not lose power when a power source transition occurs, and thus never enters a reset state. The power transition from one power source to a different power source appears "seamless" to the operation of the DRIP 20. Thus, an Ethernet session that the DRIP 20 may have been handling will not be terminated if a power source transition occurs.

An additional feature that may be implemented with the DRIP 20 is a power budgeting feature whereby the processor 202 of the DRIP 20 turns off one or more internal components to effectively place the DRIP 20 in a "low power" mode of operation. This feature could be implemented when the DRIP 20 is being powered by the USB port 18 of the server, and no power is available from input port 210, and then USB power at input port 206 is lost. In this event the regulator 204 may begin applying its +3.6V output using the power from input port 214 and the processor 202 may simultaneously take additional action to implement one or more of: a reduction in the system clock speed; disable a memory interface; disable USB interfaces; and disable video pipeline. One or more of these actions could insure that potentially multiple DRIPs 20 could remain simultaneously powered to maintain its Ethernet session with its respective server without the DRIPs collectively overtaxing the chassis power supply of the appliance 10.

Figure 6:
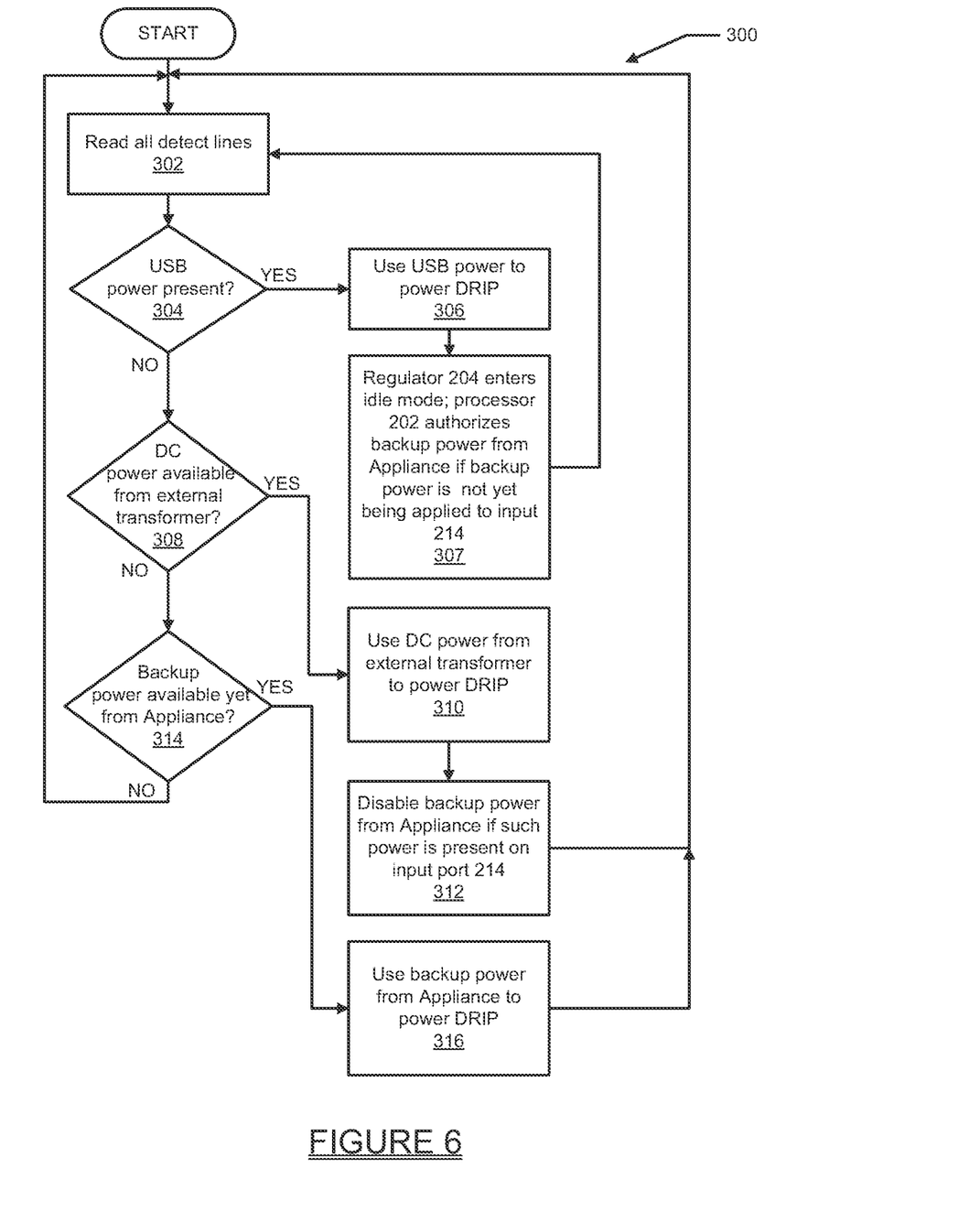
FIG. 6 is a flowchart of one exemplary sequence of operations that may be performed by the power control system shown in FIG. 5.

Referring briefly to FIG. 6, a flowchart 300 illustrates one example of a sequence of operations that may be performed by the intelligent power control system 200. This illustrated exemplary sequence of operations initially assumes that the DRIP 20 is up and running receiving USB power on input port 206. The processor 202 initially reads the detect lines 218, 220 and 222, as indicated at operation 302. The processor 202 uses the information from detect line 218 to determine if USB power is present, as indicated at operation 304. In this example since USB power is initially present, this power will continue to be used to power the DRIP 20, as indicated at operation 306, and the regulator 204 will remain in its idle mode, as indicated at operation 307. Operation 307 may also involve authorizing backup power from the appliance 10 if such backup up power is not already detected as being present from the signal on detect line 222. However, assume that during the next check at operation 304 the processor 202 detects that USB power is no longer present. In this instance the processor 202 will determine if DC power is available from an external transformer at input port 210 by the information previously read at operation 302, as indicated at operation 308. If such power is indicated as being present at operation 308, the processor 202 will allow this power to be used to power the DRIP 20, as indicated at operation 310. The processor 202 will then disable backup power from the appliance 10, if such backup power was detected as being present on input port 214, as indicated at operation 312. Operation 302 will then be repeated.

Further to the above, consider now that the check at operation 304 indicates that USB power has been lost, and further that no DC power from the external transformer is available, per the check at operation 308. The processor 202 will then determine if backup power is present yet from the appliance 10, as indicated at operation 314. If it is, then backup power from the appliance 10 will be used as indicated at operation 316.

The system 200 thus intelligently prioritizes the power available from the various power sources coupled to the DRIP 20 such that power from the server's USB port has the highest priority. Backup power from the appliance 20 is prioritized such that it is only used to power the DRIP 20 when backup power from an external transformer is not available and the power from the USB port of the server 14 is lost. Furthermore, the processor 202 prevents backup power from the appliance 10 from being made available to the DRIP 20 if DC power from the external transformer is available. Moreover, the switching from one power source to a different power source occurs with no interruption to the operation of the DRIP 20.

It will also be appreciated that while specific voltage levels have been given to help illustrate the various embodiments described above, that these voltage levels could be readily modified to meet the needs of a specific application.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An apparatus for interfacing a communications component to a managed device in communication with the communications component, the apparatus comprising:
   a first input for receiving power from the managed device that is used to power the apparatus;
   a second input for receiving power from the communications component;
   a regulator subsystem responsive to the first and second inputs, and configured to monitor the power provided on the first input; and
   the regulator subsystem further being configured to detect when power is unavailable from the first input, and then to automatically use power from the second input to power the apparatus.

2. The apparatus of claim 1, further comprising a third input for receiving power from an external power source that may be used to power the apparatus.

3. The apparatus of claim 2, wherein the regulator subsystem is responsive to the third input and allows power provided on the third input to be used to power the apparatus, regardless if power is available on the first input from the managed device.

4. The apparatus of claim 3, wherein the third input is coupled to a cable in communication with a power transformer, where the power transformer is in communication with an alternating current (AC) power source.

5. The apparatus of claim 1, wherein the second input is coupled to a port on the communications component via a cable, and receives a direct current (DC) power signal from the communications component.

6. The apparatus of claim 1, wherein the first input is in communication with a Universal Serial Bus (USB) cable, and the USB cable is connected between a USB port on the managed device and a USB port on the apparatus.

7. The apparatus of claim 1, further comprising a processor for monitoring the first and second inputs and determining when power being supplied to the first input has been lost or is not present.

8. The apparatus of claim 2, further comprising a processor for monitoring the first, second and third inputs and determining when power being supplied to the first input has been lost or is not present.

9. The apparatus of claim 8, wherein the processor is further configured to determine that power has been lost on the first input, or is not available on the first input, and then to make a check to determine if power is available at the third input, and if power is available at the third input the processor is configured to send a signal to the communications component to disable power being supplied on the second input.

10. The apparatus of claim 9, wherein the processor further is configured to detect if power on the first input is present while power on the third input is not present, and if power is detected to be present on the first input but absent on the third input, then the processor is configured to send a signal to the communications component that power from the communications component may be supplied to the second input of the apparatus.

11. The apparatus of claim 10, wherein the processor further is configured to detect when power is available on the first input, and that power has become available on the third input, and to communicate to the communications component to disable power being applied to the second input.

12. The apparatus of claim 1, wherein the regulator subsystem is configured to monitor a voltage present at a node associated with the first input, and when the voltage across the node drops below a predetermined voltage level, to automatically allow power being supplied on the second input to be used to maintain an output of the voltage regulator at the predetermined voltage level, such that the power on the second input is used to power the apparatus.

13. The apparatus of claim 1, wherein the apparatus comprises a digital rack interface pod, the managed device comprises a server, and the communications component comprises a remote access appliance for enabling a remote user to perform a keyboard, video and mouse (KVM) session over the digital rack interface pod with the server.

14. A digital rack interface pod apparatus for interfacing a remote access appliance to a managed device in communication with the remote access component, the apparatus comprising:
   a first input for receiving power from the managed device that is used to power the apparatus;
   a second input for receiving power from the remote access appliance;
   a third input for receiving power from an external power source, which may be used to power the device;
   a regulator subsystem responsive to the first, second and third inputs and for treating a designated one of the inputs as a primary power input that is used to supply power to the apparatus when power is present thereon; and
   a processor configured to prioritize an order by which other ones of the inputs besides the designated one of the inputs will be used to draw backup power from in the event that power being supplied to the designated one of the inputs is lost.

15. The apparatus of claim 14, wherein the processor is further configured to:
   monitor the first, second and third inputs; and
   to communicate with the remote access appliance and to instruct the remote access appliance to interrupt power being provided to the second input if and when power is available on the third input.

16. The apparatus of claim 15, wherein the processor is further configured to communicate with the remote access appliance to inform the remote access appliance to enable power to be supplied to the second input if and when power previously available on the third input is lost on the third input.

17. The apparatus of claim 14, wherein the regulator subsystem is configured to automatically switch from using power from either one of the two said inputs other than the designated one of the inputs, when power that was previously lost on the designated one of the inputs is reestablished on the designated one of the inputs.

18. The apparatus of claim 14, wherein the regulator subsystem comprises a switching voltage regulator configured to:
   monitor a voltage across a node associated with the designated one of the inputs; and
   while the voltage across the node remains above a predetermined level, indicating that power is being supplied to the designated one of the inputs, the switching voltage regulator will remain in an idle condition in which it does not supply a voltage output.

19. The apparatus of claim 18, wherein the switching voltage regulator is further configured to sense when the voltage across the node drops below the predetermined level and to automatically begin drawing power from one of the other two ones of the inputs besides the designated one of the inputs.

20. The apparatus of claim 19, wherein the switching voltage regulator is further configured to sense, in real time, when the voltage at the node rises above the predetermined level, and to automatically stop drawing power from the other two ones of the inputs, to thus enable power from the designated one of the inputs to again be used to power the apparatus.

21. The apparatus of claim 14, wherein the other ones of the inputs besides the designated one of inputs are tied together at a node such that the regulator subsystem is able to draw power from either of the other ones of the inputs.

22. A method for interfacing a communications component to a managed device in communication with the communications component via an apparatus, the method comprising:
   monitoring a first input that receives power from the managed device for powering the apparatus;
   using a second input to receive power from the communications component, for powering the apparatus;
   using a third input to receive power from an external power source, for powering the apparatus;
   treating a designated one of the inputs as a primary power input that is used to supply power to the apparatus when power is present thereon; and
   using a processor to prioritize an order by which other ones of the inputs besides the designated one of the inputs will be used to provide power from in the event that power being supplied to the designated one of the inputs is lost.

* * * * *